United States Patent [19]

Downing et al.

[11] Patent Number: 5,054,918

[45] Date of Patent: Oct. 8, 1991

[54] LIGHT SCANNING SYSTEM FOR MEASUREMENT OF ORIENTATION AND PHYSICAL FEATURES OF A WORKPIECE

[75] Inventors: Elizabeth A. Downing, Sunnyvale, Calif.; Steven W. Rogers, Conway, Ark.; Raymond Titsworth, Conway, Ark.; Donald J. Christian, Fremont; Michael L. Baird, Los Altos, both of Calif.

[73] Assignee: FMC Corporation, Chicago, Ill.

[21] Appl. No.: 473,754

[22] Filed: Feb. 2, 1990

[51] Int. Cl.5 .............................................. G01B 11/26
[52] U.S. Cl. .................................... 356/152; 356/155; 33/203; 33/203.11; 33/288
[58] Field of Search .................. 356/152, 155; 33/203, 33/203.11, 288; 358/93, 107

[56] References Cited

U.S. PATENT DOCUMENTS

| | | | |
|---|---|---|---|
| 4,097,157 | 6/1978 | Lill | 356/152 |
| 4,338,818 | 7/1982 | Hill et al. | 73/462 |
| 4,402,603 | 9/1983 | Lill | 356/152 |
| 4,645,348 | 2/1987 | Dewar et al. | 356/376 |
| 4,863,266 | 9/1989 | Masuko et al. | 356/152 |
| 4,898,464 | 2/1990 | Thorne et al. | 356/152 |
| 4,899,218 | 2/1990 | Waldecker et al. | 356/155 X |

OTHER PUBLICATIONS

One page brochure, Foxboro/Octek Inc., Non Contact On Line Measurement, as seen in "Sensors, the Journal of Machine Perception", vol. 4, No. 11, Nov. 1987.
"Geometric Modeling", Michael E. Mortenson, John Wiley & Sons, Copyright 1985, (pp. 366-369 and pp. 512-522).

Primary Examiner—Linda J. Wallace
Attorney, Agent, or Firm—H. M. Stanley; R. C. Kamp; R. B. Megley

[57] ABSTRACT

A structured light scanning system observes, interprets and provides structural feature size, position and movement data in automotive service equipment applications where such feature characteristics must be determined either preliminary to or ultimately for measurement of quantities affecting automotive performance, such as tire/rim assembly balance, runout and alignment or brake surface planarity and smoothness.

45 Claims, 9 Drawing Sheets

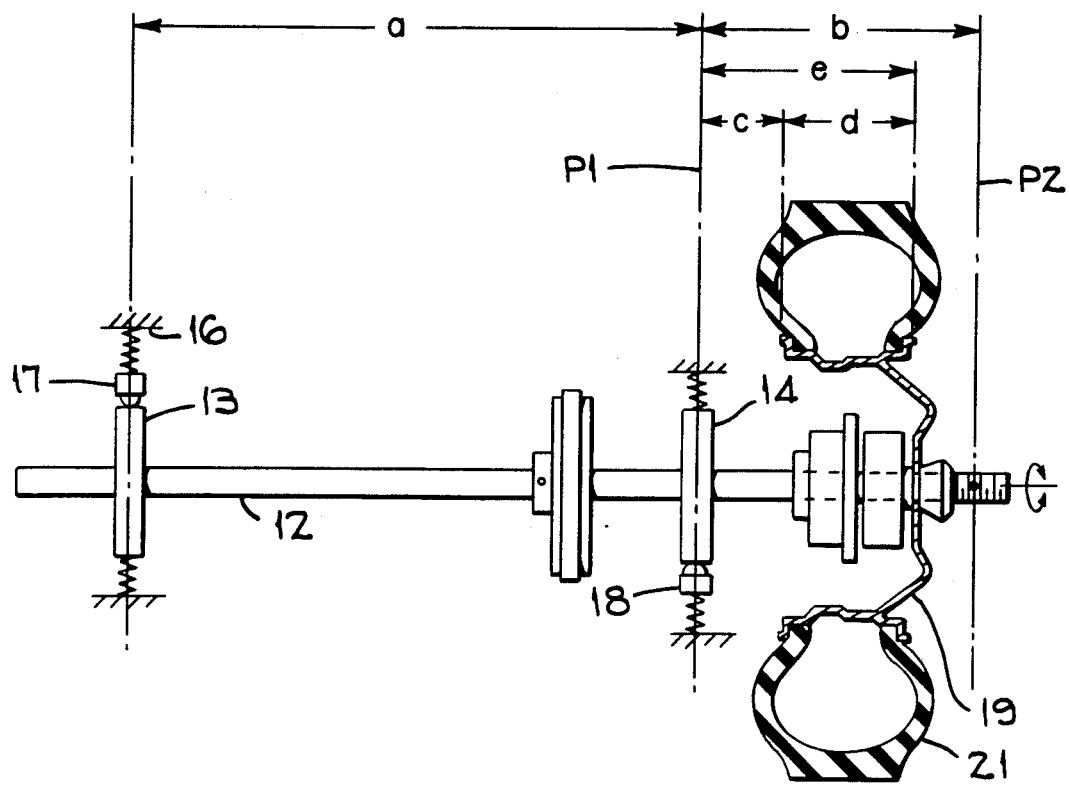
FIG_1

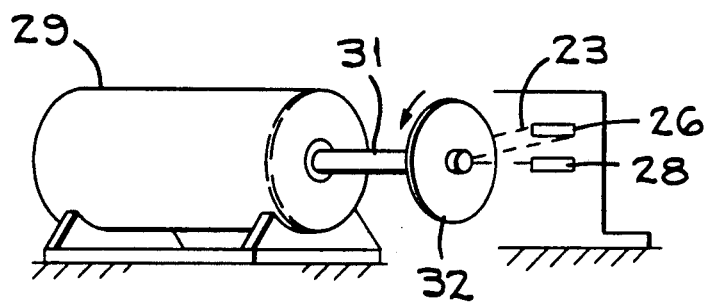
FIG_3
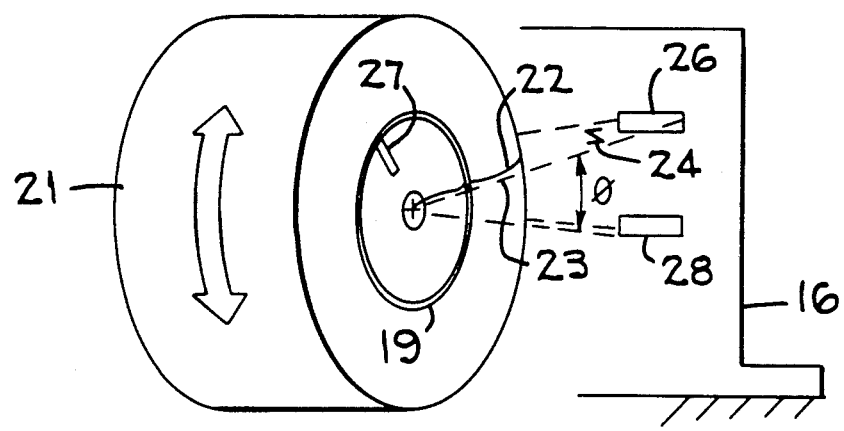
FIG_2

FIG_4
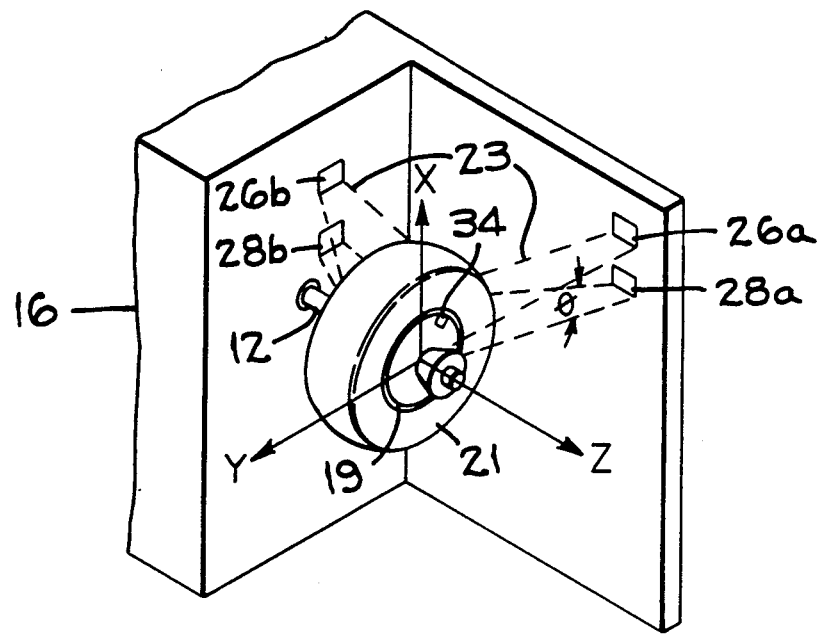
FIG_5
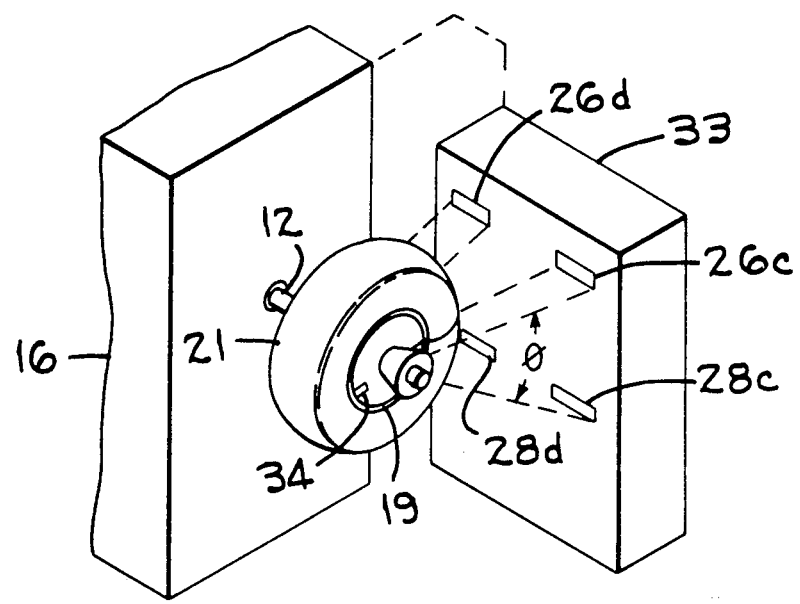

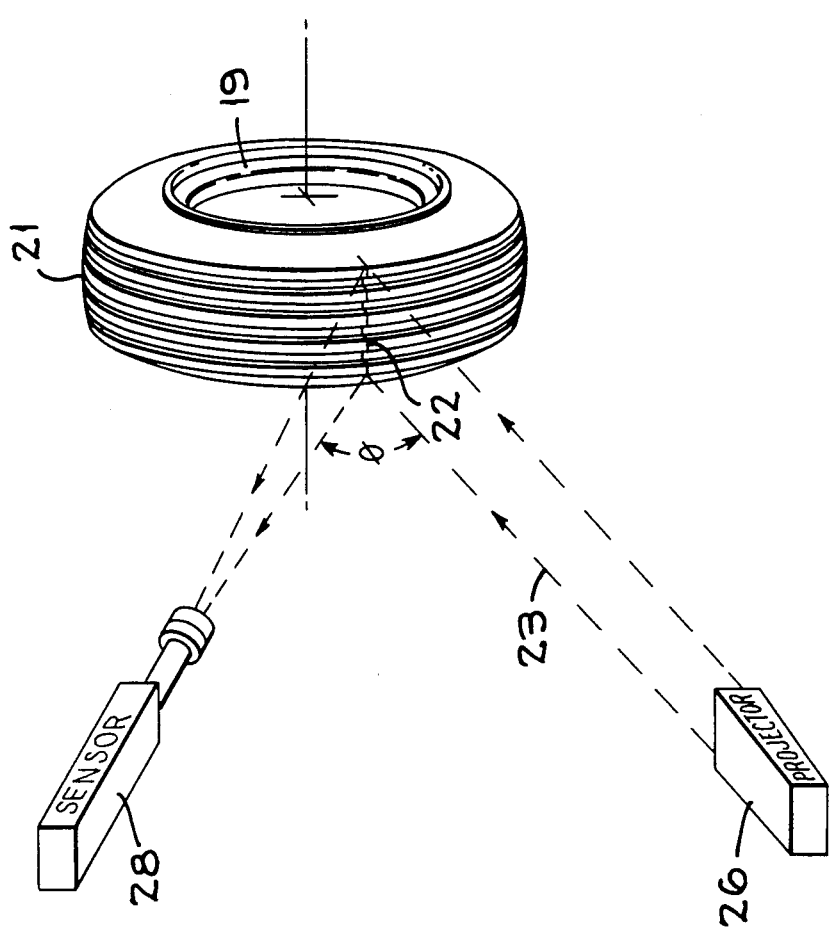

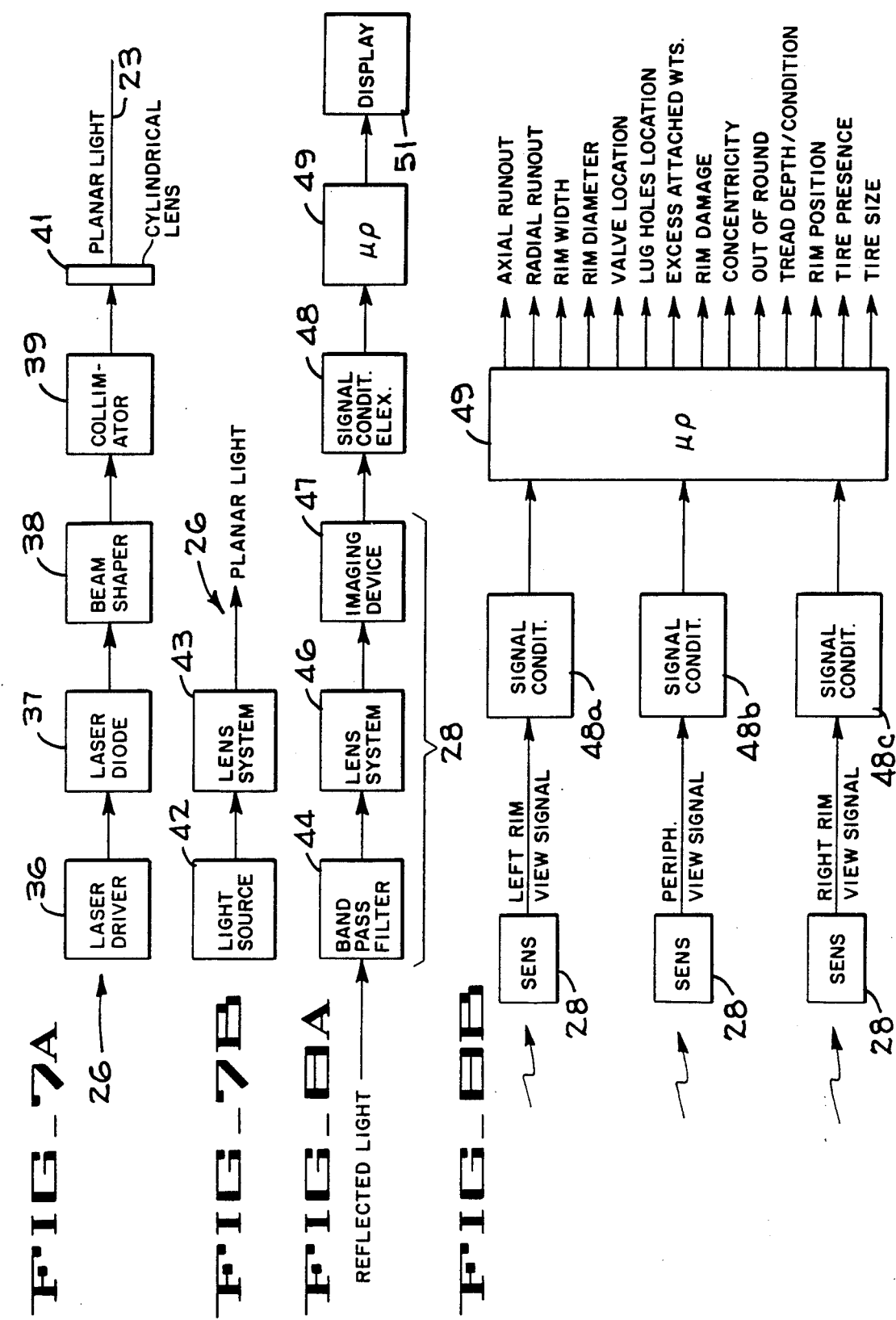

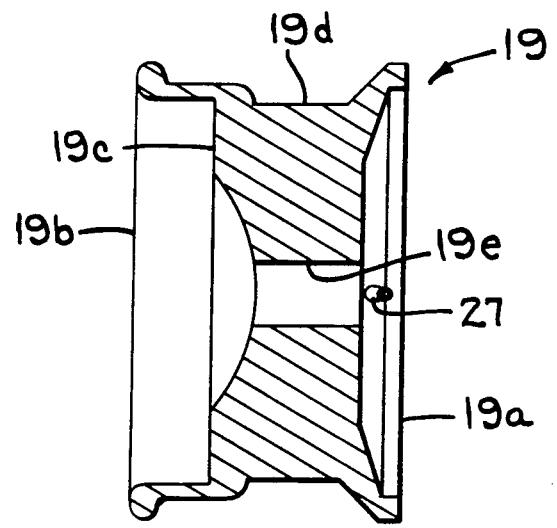
FIG_9
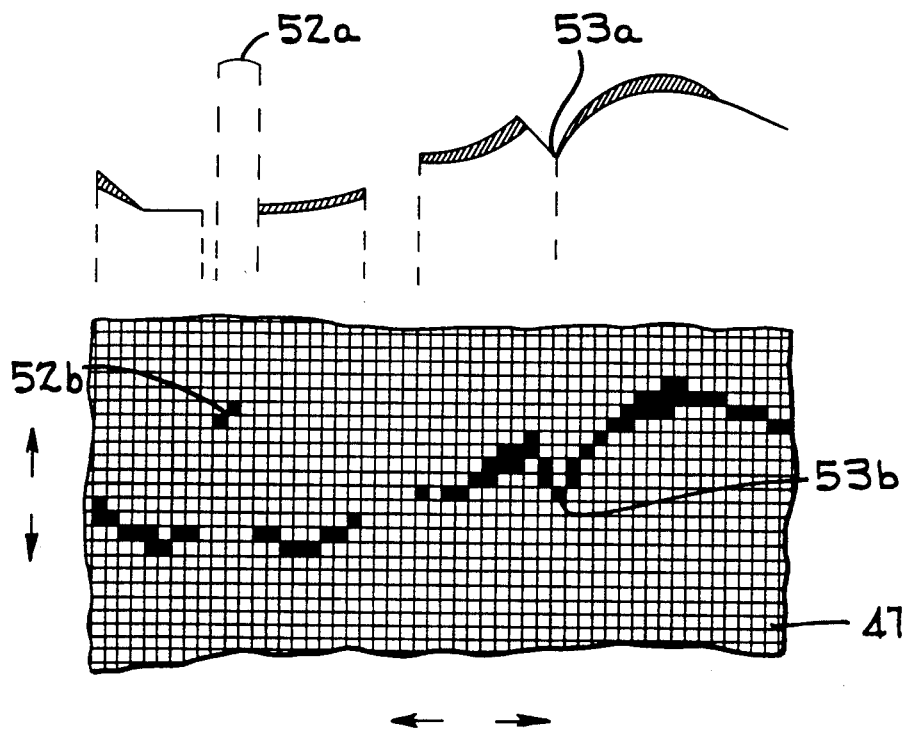
FIG_10A
FIG_10B

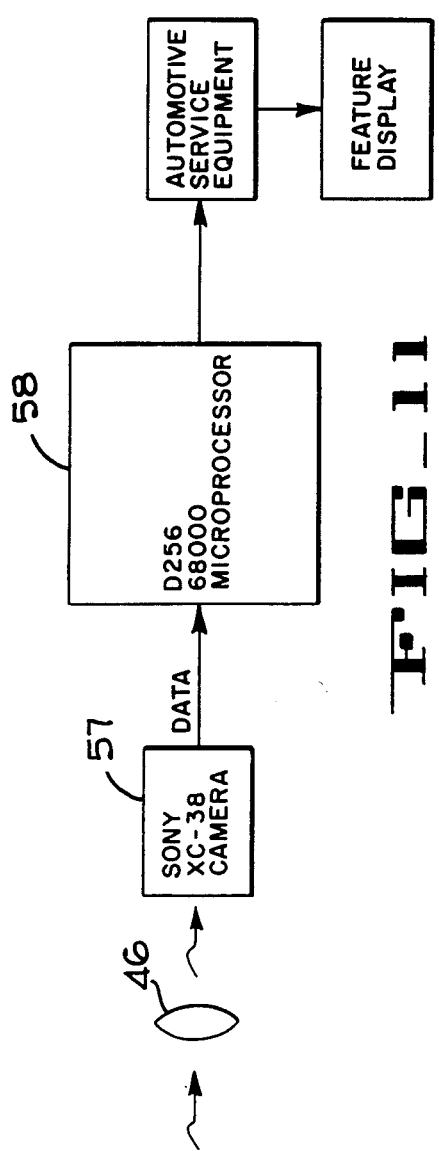
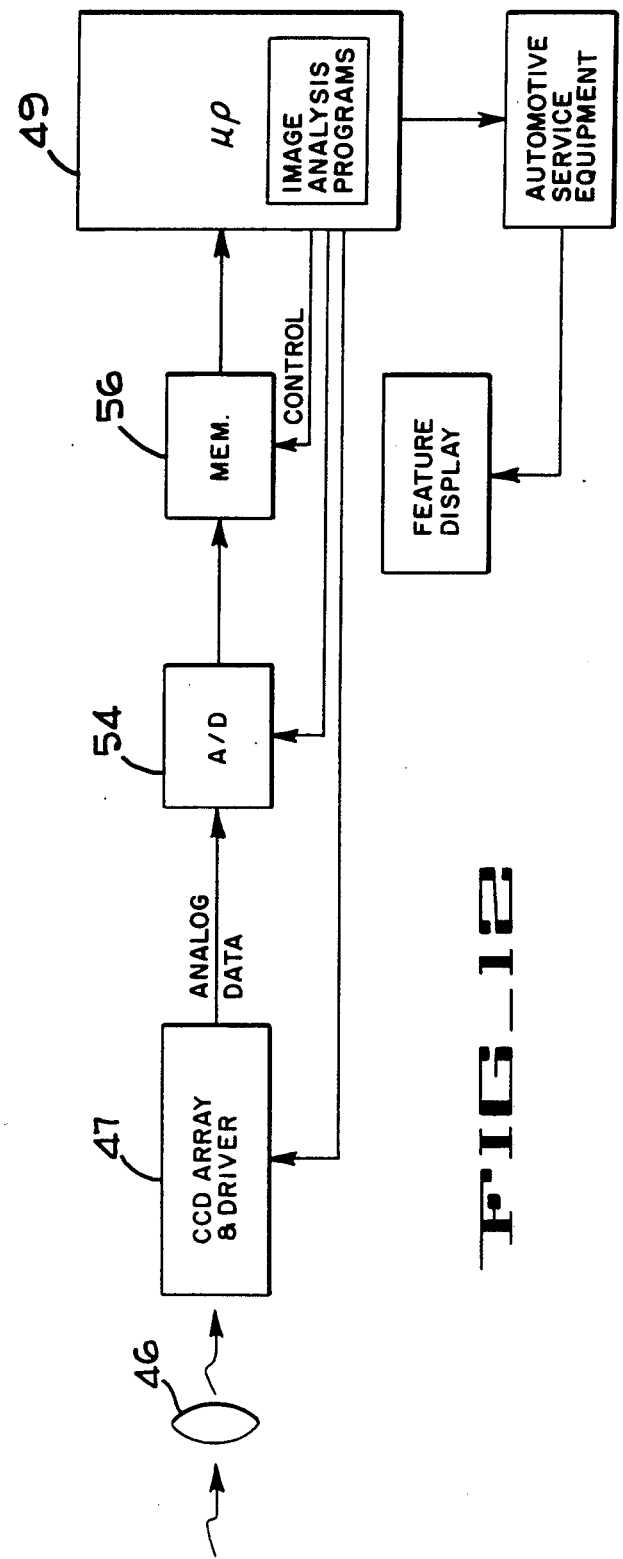

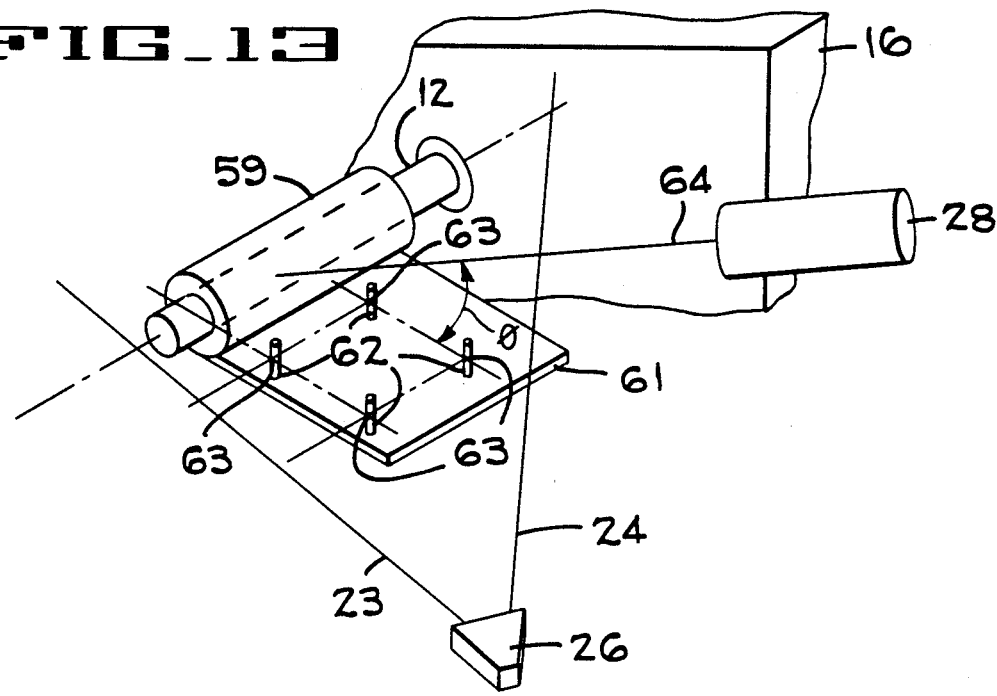
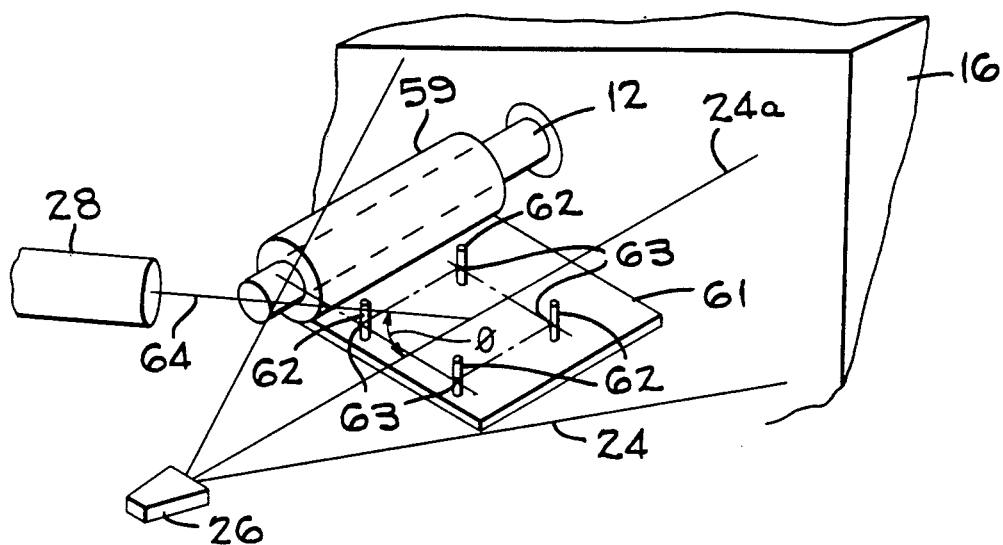

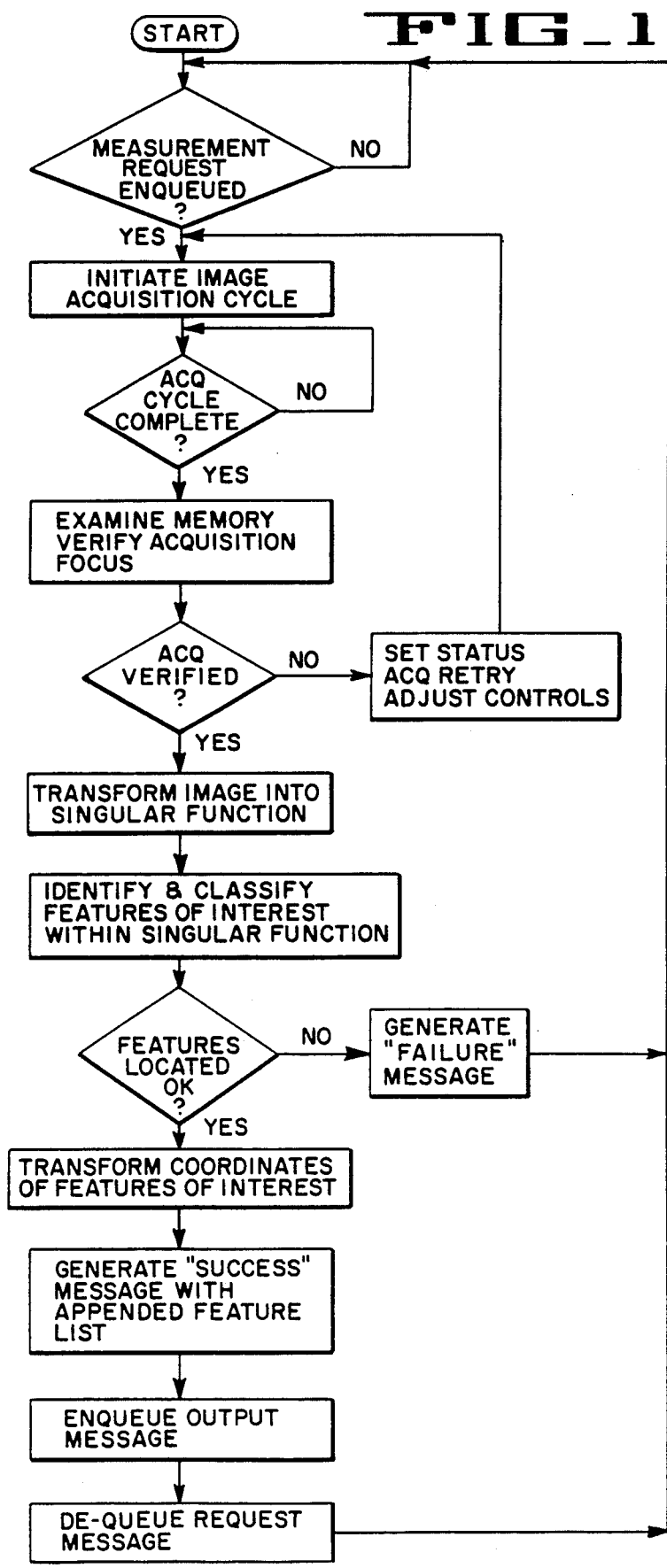

LIGHT SCANNING SYSTEM FOR MEASUREMENT OF ORIENTATION AND PHYSICAL FEATURES OF A WORKPIECE

BACKGROUND OF THE INVENTION

This invention relates to apparatus for measuring the topography (feature locations, dimensions and physical configuration) of a rotating body and more particularly for determining the specific dimensions and feature positions of such a body having known general physical features.

Several U.S. Patents describe wheel balancing systems requiring manual determination and input of certain required wheel dimensions to the wheel balancing system. One such system is seen in U.S. Pat. No. 4,338,818 issued July 13, 1982 to Hill et al. Systems which visually sense certain characteristics on a body, such as the presence of tire tread, are represented by the Foxboro/Oktek Inc. non contact on line measurement system seen in their brochure dated November, 1987. However, automated measurement of certain specific physical characteristics of a rotary body by a vision system and automated input of such characteristics to automotive service systems as preliminary information prior to measurement and data generation by the system is unknown.

SUMMARY OF THE INVENTION

The present invention is directed to apparatus for determining the physical configuration of a body or workpiece mounted for rotating motion on a spindle, and includes light beam projection means for projecting a light beam along a path toward the body on the spindle and optical means for converting the light beam into a beam contained substantially in a single plane and therefore termed a planar light beam. Further, light sensing means is included which is exposed to the light reflected from the portion of the body impinged by the light beam for providing output signals responsive to the received reflection. Means is coupled to the sensing means for processing the signals to provide data relating to the body configuration.

The invention described herein relates to a wheel rim/tire assembly parameter measurement apparatus for a dynamic wheel balancer having a spindle for mounting the wheel rim/tire assembly for rotation thereon and includes a light beam projection means mounted on the wheel balancer providing a light beam directed along a path toward wheel rim/tire assembly on the spindle. Also included is optical means for converting the light beam to a beam contained in substantially a single plane, a light sensing means exposed to light reflected from the area on the rim/tire assembly impinged by the converted light beam for providing signals responsive thereto, and means receiving said signals provided by the light sensing means for providing data relating to wheel rim/tire assembly feature locations, dimensions and physical configuration.

In another aspect of the invention apparatus is provided for determining the physical configuration of a body mounted for rotating motion on a spindle. The invention includes a light beam projection means for projecting a light beam along a path directed toward the body on the spindle, optical means for converting the light beam into a beam contained substantially in a single plane and therefore called a planar light beam, and light sensing means exposed to light reflected from the portion of the mounted body which is impinged by the planar light beam for providing output signals responsive thereto. Further means is provided which is coupled to the light sensing means for processing the signals to provide data relating to the body configuration.

The method of the present invention provides the determination of specific physical characteristics of a body or workpiece which has known general body characteristics and features, wherein the body is mounted for rotational motion on a spindle within a known body coordinate system. The process includes the step of directing a planar light array toward the body from a known direction relative to the body coordinate system. Further, the process includes detecting the impingement of the planar light array on the body from a known direction relative to the planar light array known direction and calibrating the detected impingement of the light array for distances and locations in the known body coordinate system. Additionally, the process includes transforming the detected impingement into discrete distances and positions in the known body coordinate system, whereby the specific body characteristics and feature positions are established in the body coordinate system.

BRIEF DESCRIPTION OF THE DRAWINGS

FIG. 1 is a diagrammatic elevation view of an unbalance measurement system which may be utilized with the present invention.

FIG. 2 is a diagrammatic perspective view of automotive service equipment utilizing the present invention.

FIG. 3 is a diagrammatic perspective view of a brake disc lathe utilizing the present invention.

FIG. 4 is a diagrammatic perspective view of a wheel balancer using the present invention.

FIG. 5 is another diagrammatic perspective view of a wheel balancer utilizing the present invention.

FIG. 6 is a diagrammatic perspective view of a tire tread measurement system utilizing the present invention.

FIG. 7A is a block diagram showing one embodiment of the projector in the present invention.

FIG. 7B is a block diagram of an alternative embodiment of the projector in the present invention.

FIG. 8A is a block diagram of one embodiment of a light detector utilized in the present invention.

FIG. 8B is a block diagram of an alternative embodiment of a light detector used in the present invention.

FIG. 9 is an elevation section of a vehicle wheel rim.

FIG. 10A is a diagram of a scene viewed by a light detector in the present invention.

FIG. 10B is a diagram of a photo sensitive matrix utilized in the present invention.

FIG. 11 is a block diagram of a light detection and computer section of the present invention.

FIG. 12 is an alternative block diagram of the light reception and computation section of the present invention.

FIG. 13 is a perspective view of a calibration device for the present invention.

FIG. 14 is a perspective view of an alternative calibration arrangement for the present invention.

FIG. 15 is a flow chart depicting control functions for the program implemented by the system processor.

DESCRIPTION OF THE PREFERRED EMBODIMENT

The invention disclosed herein is generally for use in automotive service equipment, although other uses exist. This disclosure herein will be made in conjunction with specific types of automotive service equipment with which the invention functions. Such equipment includes vehicle wheel balancers, automotive brake disc lathes, and vehicle wheel aligners.

Referring to FIG. 1 of the drawings, an off-the-car wheel unbalance measuring system 11 is displayed having a rotationally driven wheel mounting shaft 12 mounted in bearings 13 and 14 supported by a wheel balancer framework 16. A pair of force transducers 17 and 18 are mounted in the framework adjacent to and spaced axially along the shaft at the locations of the bearings 13 and 14. The force transducers are coupled mechanically to the shaft and provide periodic electrical output signals indicative of dynamic unbalance forces transmitted through the shaft when the shaft is driven rotationally. The angular position of the shaft is monitored by a shaft encoder (not shown) during each full revolution of the shaft. The transducer output signals are usually digitized in electrical circuitry within the balancer and calculations are performed on the digitized signals to obtain unbalance force measurements at each angular increment of shaft rotation. The calculation of the unbalance forces requires that certain measurements be made relative to the mounting location of a rim 19 and tire 21 on the shaft 12. The distances "a" and "b" are known from the physical configuration of the balancer. The distances "c" and "e" must be measured to obtain the inside and outside rim position locations so that counterbalance weights may be applied to the rim to offset unbalance in the rim and tire assembly which is measured when the rim and tire assembly is spun rotationally on the shaft 12. The width "d" of the rim is also necessary for these calculations and may be seen to be easily computed from the measured quantities "e" and "c". The system of the present invention is capable of measuring the position of the inside and the outside locations of the rim 19 relative to a coordinate system which is referenced to the structure of the balancing machine 11. In the instance illustrated in FIG. 1 the outside rim location is measured from the plane P1 as the distance "e" and the inside rim location is measured from the plane P1 as the distance "c".

Similarly, as shown in FIG. 2, in a wheel aligner or wheel balancer the location of the edge of the rim 19 may be detected by recognizing that a "stripe" of light shown at 22 in FIG. 2 will exhibit a characteristic "bump" or discontinuity as it extends over the edge of the tire rim. The "stripe" of light is formed by projecting light in the form of a beam 23 emanating substantially in a plane 24 from a projector 26 mounted on or in predetermined relation to the structure 16 of the aligner or wheel balancer. In like fashion, the "stripe" of light will, when it falls across a valve stem 27 in the rim/tire assembly illuminate the location rotationally and radially of the valve stem. The projected light pattern or array may be one of several forms, such as a half plane, an edge, a grid, or multiple stripes. The term "stripe" refers to this projected geometric pattern. A sensor or camera 28 mounted in known relationship to the projector serves to detect the position of the features of interest (such as the rim edge or the valve stem) as they are intersected by the light "stripe" and to provide signals indicative of such position. The known relationship between projector and sensor includes knowledge of the angle, indicated at $\theta$ in FIG. 2, between the planar light array and the central ray direction received by the sensor.

FIG. 3 shows portions of an automotive disc brake lathe including a driving motor 29 having a shaft 31 extending therefrom on which is mounted a brake disc 32 for turning on the face of the lathe to obtain an appropriate surface on the disc against which vehicle brake pads may bear in the vehicle braking system. The light projector 26 emitting the planar light array 23 and the light sensor 28 in the orientation and configuration mentioned in the description of FIG. 2 hereinbefore are provided in the system illustrated in FIG. 3 to perform the aforedescribed functions. It may be seen that if the disc 32 wobbles as it is rotated on the shaft 31 or if the rim and tire assembly 19/21 shown in FIGS. 1 and 2 wobbles as it is rotated about the shaft 12 (or a vehicle wheel mounting spindle), the detector 28 will observe a change in the peripheral position of the disc 32, the rim 19, or the tire 21. The system is also clearly able to detect physical features on the shaft mounted body such as the rim periphery (at the "bump" 23) or the valve stem 27 (FIG. 2), or score marks on the braking or friction surface or surfaces of disc 32 (FIG. 3), as well as the location of the inner and outer faces of the disc 32 (FIG. 3) and the inner and outer rim planes represented by the distances "c" and "e" respectively (FIG. 1).

Having described the general use of the invention disclosed herein as it applies to several types of automotive service equipment, the invention will be described in detail in conjunction with a wheel balancer as seen in FIG. 4. Two sets of projectors 26a and 26b are shown attached to the framework 16 of the wheel balancer. Two light sensors 28a and 28b are also shown mounted on the wheel balancer framework with a sensing axis in known orientation relative to the direction of projection from the projectors. The projector and sensor pair 26a/28a may be seen to be directed somewhat normal to the axis of the shaft 12. The other projector 26b and sensor 28b are seen to be located on the wheel balancer frame so that they are directed in approximately a direction parallel to the axis of the balancer shaft 12. Both orientations of the projector and sensor pairs are useful, the algorithms for reducing the data provided by the sensors 28 taking into account the orientation of the projector and sensor relative to the coordinate system defined for the wheel balancer. A three dimensional coordinate system for the wheel balancer of FIG. 4 may be described, for example, as having the X axis in a vertical direction, the Y axis in a horizontal direction, and the Z axis both colinear with the axis of the shaft 12 and orthogonal to the X and Y axes. This may be seen by reference to FIG. 4. The coordinate transformations are derived with reference to "Geometric Modeling", Michael E. Mortenson, John Wiley and Sons, copyright 1985, pages 366-369 and 512-522.

An alternative configuration of the projectors and sensors of the present invention may be seen in FIG. 5. Again a wheel balancer framework 16 is depicted which has affixed thereto structure 33 carrying a projector 26c and sensor or detector 28c for viewing the outside surface of the rim and tire assembly 19/21 and a projector and sensor pair 26d and 28d, respectively, located in the structure 33 to access the inside surface of the rim and tire assembly. It should be noted that in both FIGS. 4 and 5 a counterbalancing weight 34 is shown attached to the periphery of the rim 19. As described for the location of the edge of the rim 19 or the valve stem 27, the counterbalance weights 34 may also be detected and located by the system of the present invention.

FIG. 6 shows the disclosed invention used for the purpose of tire tread measurement. The projector 26 is shown projecting the planar light beam 23 which impinges the periphery of the tire 21 appearing to project the "stripe" 22 across the tread. The "stripe" is observed by the light sensor or camera 28 which, as mentioned before, has its viewing axis oriented at a predetermined angle $\theta$ from the projection direction of the projector 26. Tire size and tread depth and condition across the tread width of the tire 21 may be calculated as hereinafter described. One purpose of FIG. 6 is to show the "stripe" of light on the object toward which the planar light array 24 is directed and to show the predetermined angle $\theta$ between the direction of the light beam 23 and the viewing angle of the camera 28. As will also be hereinafter described, the rotation of the camera 28 about the viewing direction is also controlled in the instant invention so that both the direction of the central received ray and the rotational orientation of the camera/sensor 28 relative to the plane 24 of beam 23 are known.

Referring to FIG. 7A, a block diagram of one embodiment of the projector 26 is shown. A laser driver 36 of the type shown in the Sharp Laser Diode User's Manual, copyright Sharp Corporation 1986, pages 26 and 27 is coupled to a laser diode 37, such as that manufactured by Sharp and designated LT020MC. A beam shaper 38 is disposed in the path of the laser diode beam to shape the slightly elliptical laser diode beam into a cylindrical beam. An appropriate beam shaper is represented by the laser diode mounted anamorphic prism pair manufactured by Melles Griot, product No. 06 GPA 001. The shaped beam is passed through a collimating lens 39 such as manufactured by Melles Griot product No. 06 GLC 001. The collimated beam is next directed to a cylindrical lens 41. The cylindrical lens may be a glass rod approximately 1 millimeter in diameter. The edge of the planar light beam 23 is shown emanating from the cylindrical lens in FIG. 7A.

An alternative source of the planar light beam is seen in the projector 26 shown in FIG. 7B. Any light source 42, such as an incandescent bulb, etc., may be used and directed toward a lens system 43. The lens system may include an expander/collimator, a slit for passing a "stripe" of the collimated light, and a plano-convex lens interposed in the path of the collimated slit of light to disperse the light in a plane.

The expander/collimator receives light radiation from the incandescent bulb and provides a beam of collimated light. The slit provides the planar shape to the beam and the plano-convex lens disperses the plane of light in a fan shape if necessary. Alternatively, an array of point light sources arranged in a line could be used with a simple lens system to produce the planar light beam.

FIG. 8A is a block diagram of one embodiment of the light sensing portion 28 of the system. The light reflected from a "stripe" 22 (where the planar light beam 23 impinges the body at which the beam is directed) is received by a band pass filter 44 to remove ambient light or other light energy "noise" from the reflected light received. The filtered light is passed to a lens system 46 which serves to focus the received light on an imaging device 47 which may be a charge coupled device. The light is pulsed and time-synchronized with the charge-coupled device 47 in order to further eliminate the effects of stray light "noise". The signals from the charge coupled device are connected to signal conditioning electronics 48 which prepare the signals for submittal to a microprocessor 49 which operates on the raw input data with the coordinate transformation algorithms derived from the teachings of Mortenson mentioned hereinbefore. The output from the microprocessor may be coupled to a display 51 for information dispersal purposes.

FIG. 8B shows a plurality of sensors 28 as seen for example in FIGS. 4 and 5 herein. The sensors may be positioned to receive light from different sections or portions of the body which is being either observed in orientation or being subjected to measurement of surface features thereon. FIG. 8B shows light sensing signals coming from the left rim portion, periphery and right rim portion of a rim and tire assembly, each of the left, peripheral and right signals being transmitted to respective signal conditioning circuits 48*a*, *b* and *c*. The three conditioned signals are in turn coupled to the microprocessor 49 and in the case of a wheel balancing system, information relating to wheel assembly runout, rim width, rim diameter, rim position valve stem location, lug hole location, excess attached balance weights, rim damage, rim concentricity and rim "out-of-round" will be obtained. The information may be displayed directly in the form of digital or numerical readings or may be transformed into specific service advice and procedures to which the rim, or other automotive component, should be subjected.

A typical rim 19 is shown in FIG. 9 having an outer rim surface 19*a*, an inner rim surface 19*b*, a flat surface 19*c* upon which adhesive backed weights may be applied, a drop center 19*d*, and a center mounting hole 19*e*. The valve stem 27 is also shown extending through the stem receiving hole in the rim. Inspection of the outer rim 19*a* reveals the discontinuity which occurs at the periphery of the rim adjacent to a tire bead mounted on the rim to which reference will be made hereinafter.

FIG. 10A is a diagram of a "scene" which is representative of the "stripe" 22 of light which lies across an object being observed by the system camera or light sensor 28 due to impingement of the plane of light 24 on the object such as the rim/tire assembly 21/19. The light sensor 28 includes the charge coupled device 47 previously alluded to, which is a two-dimensional matrix of light sensor cells as seen in FIG. 10B. The matrix array may be, for example, 256 by 256 sensing cells with cell driver circuitry. Each cell is termed a pixel. As the "scene" of FIG. 10A is exposed to the light sensor cell array of FIG. 10B certain of the cells or pixels are excited by the received light. The "scene" is aligned in FIGS. 10A and 10B with the array of sensing cells. Proceeding from the left side of FIGS. 10A and 10B toward the right, a discontinuity or excitation of two pixels 52*b* lying well above their neighbors in FIG. 10B corresponds with a high point 52*a* in the "scene". This corresponds with the camera view of the intersection of the planar light beam with a valve stem 27 on the rim of a rim and tire assembly. Proceeding further toward the right in FIGS. 10A and 10B, a "V" shaped portion 53*a* of the "scene" is accompanied by a similarly "V" shaped group of excited sensors or pixels 53*b* in FIG. 10B. This corresponds to the intersection of the planar light beam with the periphery of the rim 19 in FIG. 9 or the "bump" in the light "stripe" 22 of FIG. 2. As seen in FIG. 12, the charge coupled device array 47 and its driving circuitry provides a stream of analog data according to the signal intensity values from the excited pixels which in turn depend upon the reflected light intensity which falls upon the individual pixels. An analog to digital converter 54 receives the serial stream of analog light-cell signals and digitizes the signals. The digitized signals are stored in a memory 56, and are called up by the microprocessor 49 and operated upon by the programs entered into the microprocessor in accordance with the flow chart of FIG. 15. The microprocessor used in the preferred embodiment of this invention is the Intel 80286. The data thus obtained through the operation of the microprocessor is transmitted to automotive service equipment as previously described herein (FIGS. 2 through 6) for the purpose of providing information which is preliminary to certain measurements or represents the desired measurements themselves. Optionally, the data measured by the invention disclosed herein may be displayed numerically and/or pictorially where a display proves of some advantage.

In FIG. 12 the components shown therein may be categorized as a light sensing means and a vision system, including memory 56, microprocessor 49 and an associated display. The features displayed may be measurements, diagnoses, service advice, etc.

The manner in which the program implemented by microprocessor 49 operates on the data provided by the output from the matrix of FIG. 10B is shown in the flow chart of FIG. 15. Initially the program asks if it is appropriate to take a measurement. The appropriateness is determined in the wheel balancer equipment by indication from a shaft encoder attached to the shaft 12. If the time is right, a measurement request is submitted. An image is obtained which is sometimes called a "snapshot". This command obtains the image from the sensor viewed scene of FIG. 10A by the sensor matrix of FIG. 10B providing a quantized sensor image. The image is obtained by a scan of the pixels of FIG. 10B. The scan is completed, digitized and the sensed data is placed in memory. A cursory examination of the data in memory is made to detect the presence of any gross problems; i.e., no data or partial data due to mud on the sensor lens. If problems exist in the data things may be done to rectify the situation; i.e., adjust sensitivity of the sensor or increase the brightness of the light "stripe" if the problem is merely a light reducing film over the lens. After adjustments, the measurement is repeated.

When the image acquisition is verified from the data in memory, the image is transformed into a "singular function", which means noise and ambiguities are removed. At this point the singular function is examined for features of interest. The identification is application dependent. The features of interest, as shown in FIGS. 10A and 10B, may be valve stem and wheel rim locations for wheel balancers. If no features are identified the program returns to receive the next measurement request. If a feature is identified, the coordinates of the feature are determined using the approach described in the Mortenson text mentioned hereinbefore.

Next a "success" message is prepared with a list of the features found and where they were found; i.e., valve stem at six degree rotational position on shaft 12 for a wheel balancer. The next available space (the six degree location in this instance) is identified in an output queue and the feature and location written into the queue. The program then requests advancement to the next measurement request and the process is repeated. In this fashion all of the features of interest are obtained locationally for a rotating workpiece or body like a wheel on a wheel balancer shaft (valve stem, excess weights, rim, etc.) or for a stationary body like a wheel addressed by an alignment system (wheel toe, wheel runout, etc.).

Another embodiment of the light sensor and data reduction portion of the invention actually reduced to practice is shown in FIG. 11. A Sony XC-38 camera 57 functions as the light sensor 28 receiving light "stripe" reflections through lens 46 and providing data coupled to a D256 68000 microprocessor 58 manufactured by International Robomation Incorporated of Carlsbad, Calif. The microprocessor functions to reduce the data provided by the XC-38 camera. Microprocessor 58 further provides the reduced data to automotive service equipment and to feature displays as desired, as discussed previously herein in conjunction with the description of FIG. 12. As explained in conjunction with FIG. 12 the components of FIG. 11 may be described as including a light sensor including camera 57 and a vision system including microprocessor 58 and an associated display.

The system embodiments described herein must be calibrated to obtain data which is useful in making the measurements and orientation determinations discussed previously herein. FIG. 13 shows a wheel balancer framework 16 having a shaft 12 extending therefrom as seen in FIGS. 4 and 5. A collar 59 is attached to the shaft 12 having a plate 61 extending therefrom in a plane below or displaced from the plane which includes the axis of the shaft 12 as seen in FIG. 13. The plate has an array of four upwardly extending short rods 62 arranged in a rectangular pattern on the plate. The rods have reference marks or points 63 thereon all lying within a plane which extends through the rotational axis of the shaft 12. The extension of the plane including the four points 63 through the axis of the shaft 12 is only for the purpose of simplifying the coordinate transformation explained in the Mortenson text. The light source is disposed in a position relative to the framework 16 and shaft 12 such that the plane of light passes through the four points 63 on the rods 62, and therefore the rotational axis of the shaft 12. The angle of divergence of the planar light beam 23 is wide enough to encompass all points of interest on the body to be observed by the camera 28 and also to impinge on all four of the points 63 during calibration. The distances between the rods 62 on the plate 61 are predetermined. For example, the distance may be five inches between rods, thus forming a square on the plate. The sensor or camera 28 is oriented so that the camera axis 64 is at a known elevation angle $\theta$ as hereinbefore described in conjunction with the description of FIG. 6. Therefore, in the calibrate mode, the camera may view the four points 63 and since the angle $\theta$ and the dimensions between the points 63 are known, accurately determine a viewing scale for distances observed along the light "stripe" 22 when the light plane 24 impinges on a workpiece or body having features which are to be observed and measured.

The light source has associated therewith a coordinate system $X_p$, $Y_p$, and $Z_p$. The plane of illumination 24 is coincident with the $X_p$, $Y_p$ plane. The illumination plane is thus at a position where $Z=0$ throughout the plane. Therefore, the Z axis for the light source coordinate system is perpendicular to the light plane 24. Thus, it may be seen that once calibrated, the camera or light sensor 28 detects points along the light "stripe" 22 which are $X_p$, $Y_p$ and $Z=0$ points in the light source coordinate system. The actual positions of the $X_p$, $Y_p$ points may therefore be determined in $X_p$, $Y_p$ space. The three dimensional coordinates of any points in this plane may be determined using the procedures described in the text Geometric Modeling, Michael E. Mortenson, John Wylie and Sons, Publishers, Copyright 1985, pages 366 to 369 and pages 512 to 522. It is well known to thereafter transform the data obtained for the $X_p$, $Y_p$, $Z_p$ coordinate system to the X, Y, Z coordinate system shown in conjunction with the description of the wheel balancer in FIG. 4 of the drawings.

FIG. 14 shows another calibration fixture for the invention described herein wherein centerline 24a of the light plane 24 is directed parallel to the axis of the shaft 12 extending from the framework 16 of the wheel balancer. Additionally, the sensor line of view or axis 64 and the light plane centerline 24a are in a plane which is perpendicular to the light plane 24. As described before in the description of the general calibration case of FIG. 13, the collar 59 has an array of four rods 62 extending from a plate 61. Target points 63 on the rods 62 are coplanar with each other and the axis of shaft 12. The light sensor of camera 28 functions in the same way as described for the structure of FIG. 13, having the central axis 64 of the camera 28 directed at the known elevation angle $\theta$ relative to the light plane 24 as described in conjunction with FIG. 13. The rods 62 are spaced known distances apart (i.e., 5 inches between each rod, thereby forming a square on the plate 61) so that the camera viewing angles can be calibrated to measure true distances of body features encompassed by the view along the light "stripe" 22 within the $X_p$, $Y_p$, $Z_p$ coordinate system. These distances and positions are then transformed into the X, Y, Z coordinate system (FIG. 4). The purpose of the calibration arrangement of FIG. 14 is only to simplify the geometric procedures explained in the Mortenson text and is not necessary to the function of the invention.

Although the best mode contemplated for carrying out the present invention has been herein shown and described, it will be apparent that modification and variation may be made without departing from what is regarded to be the subject matter of the invention.

What is claimed is:

1. A wheel rim/tire assembly parameter measurement apparatus for a dynamic wheel balancer having a spindle for mounting the wheel rim/tire assembly for rotation thereon, comprising
light beam projection means mounted on the wheel balancer providing a light beam directed along a path toward a wheel rim/tire assembly on the spindle,
optical means for converting said light beam to a beam contained in substantially a single plane,
light sensing means exposed to light reflected from the area on the rim/tire assembly impinged by the converted light beam for providing signals responsive thereto, and
means receiving said signals provided by said light sensing means for providing data relating to wheel rim/tire assembly feature locations, dimensions and physical configuration.

2. A wheel balancer as in claim 1 wherein said light beam projection means comprises means for mounting said light beam projection means to illuminate the periphery of the wheel rim/tire assembly with said light beam, whereby the wheel rim/tire assembly runout is measured.

3. A wheel balancer as in claim 1 wherein the wheel rim has an inner rim and an outer rim and wherein said light beam projection means comprises means for mounting said light beam projection means to illuminate the inner and outer rims with said light beam whereby inner and outer rim separation is measured.

4. A wheel balancer as in claim 3 wherein said light beam projection means comprises a beam splitter for splitting said light beam, and reflector means, each of said beam splitter and said reflector means functioning to direct a portion of said split light beam toward one of the inner and outer rims, respectively.

5. A wheel balancer as in claim 1 wherein the wheel rim has an inner rim and an outer rim and wherein said light beam projection means comprises means for mounting said light beam projection means to illuminate the inner and outer rims and the periphery of the wheel rim/tire assembly with said light beam whereby rim edge and tire valve locations, inner and outer rim separation, and wheel rim/tire assembly runout are measured.

6. A wheel balancer as in claim 5 wherein said light sensing means comprises first, second and third light sensors exposed to said inner rim, wheel rim/tire assembly periphery and outer rim respectively, means for digitizing said light sensing means signals, and a digital signal processing for providing said data relating to wheel rim/tire assembly location, dimensions and physical configuration.

7. A wheel balancer as in claim 1 wherein said light beam projection means comprises a laser light source.

8. A wheel balancer as in claim 1 wherein said light beam projection means comprises a white light source, and wherein said optical means comprises a collimator interposed in the path of said light beam from said white light source, and a cylindrical lens interposed in the path of said light beam from said collimator.

9. A wheel balancer as in claim 1 wherein said light sensing means comprises a band pass filter receiving the reflected light and passing filtered reflected light, a lens exposed to and operating to focus the filtered reflected light, and a charge coupled device situated to receive the focused filtered reflected light.

10. A wheel balancer as in claim 1, wherein said light sensing means comprises a light sensitive camera, and wherein said means coupled to receive said signals responsive to reflected light comprises a vision system for providing said data relating to wheel rim/tire assembly feature locations, dimensions and physical configuration.

11. A wheel balancer as in claim 1, wherein said light sensing means comprises a two-dimensional charge coupled device array, and wherein said means coupled to receive said signals responsive to reflected light comprises an analog to digital converter providing a digital output, a memory store coupled to receive said digital output, and a microprocessor for accessing said memory store and providing said data relating to wheel rim/tire assembly feature locations, dimensions and physical configuration.

12. A wheel balancer as in claim 1, wherein said light sensing means comprises a two dimensional light sensing array, and wherein said means coupled to receive said signals responsive to reflected light comprises an analog to digital converter, and a processor for providing said data relating to wheel rim/tire assembly feature locations, dimensions and physical configuration.

13. A wheel rim/tire assembly parameter measurement apparatus for a dynamic wheel balancer as in claim 1 wherein said light beam projection means comprises first and second light beam projection means, and wherein said light sensing means comprises first and second light sensing means exposed to light reflected from the area on the rim/tire assembly impinged by the converted light beam from said first and second light beam projection means respectively.

14. Runout measurement apparatus for detecting runout in a rotatable member relative to a spin axis for the rotating member, comprising
light beam projection means for projecting a light beam along a path toward the rotatable member,
optical means for converting said light beam into a substantially planar beam,
light sensing means disposed to receive light from said substantially planar beam which is reflected from the rotatable member, said light sensing means providing an output signal indicative of said planar beam reflection, and
signal processing means coupled to said output signal for producing data representing a measurement of change in peripheral position of the rotatable member as it is rotated about the spin axis.

15. Runout measurement apparatus as in claim 14 wherein the rotatable member is a brake disc, and wherein said spin axis is defined by the spindle of a brake disc lathe, and wherein said light beam projection means comprises a beam splitter for splitting said light beam, and reflector means, each of said beam splitter and said reflector means functioning to direct a portion of said split light beam toward opposing sides of said brake disc.

16. Runout measurement apparatus as in claim 15 wherein said light beam projection means further comprises a laser light source.

17. Runout measurement apparatus as in claim 15 wherein said light beam projection means further comprises a white light source, and wherein said optical means comprises a collimator interposed in the path of said light beam from said white light source, and a cylindrical lens interposed in the path of the said light beam from said collimator.

18. Runout measurement apparatus as in claim 15 wherein said light sensing means comprises a band pass filter receiving the reflected light and passing filtered reflected light, a lens exposed to and operating to focus the filtered reflected light, and a charge coupled device situated to receive the focused filtered reflected light.

19. Runout measurement apparatus as in claim 14 wherein said rotatable member is a wheel rim/tire assembly mounted on a vehicle being subjected to wheel alignment, and wherein said spin axis is defined by the spindle on which said wheel rim/tire assembly is mounted, said light beam projection means comprising means for mounting said light beam projection means to illuminate the periphery of the wheel rim/tire assembly with said light beam.

20. Runout measurement apparatus as in claim 19 wherein the wheel has an inner rim and an outer rim, and wherein said light beam projection means comprises means for mounting said light beam projection means to illuminate said inner and outer rims with said light beam.

21. Runout measurement apparatus as in claim 20 wherein said light beam projection means comprises a beam splitter for splitting said light beam and reflector means, each of said beam splitter and reflector means functioning to direct a portion of said slit light beam toward one of the inner and outer rims respectively.

22. Runout measurement apparatus as in claim 19 wherein the wheel has an inner rim and an outer rim and wherein said light beam projection means comprises means for mounting said light beam projection means to illuminate the inner and outer rims and the periphery of the wheel rim/tire assembly with said light beam.

23. Runout measurement apparatus as in claim 19 wherein said light beam projection means comprises a laser light source.

24. Runout measurement apparatus as in claim 19 wherein said light beam projection means comprises a white light source, and wherein said optical means comprises a collimator interposed in the path of said light beam from said white light source, and a cylindrical lens interposed in the path of said light beam from said collimator.

25. Runout measurement apparatus as in claim 19 wherein said light sensing means comprises a band pass filter receiving the reflected light an passing filtered reflected light, a lens exposed to and operating to focus the filtered reflected light, and a charge coupled device situated to receive the focused filtered reflected light.

26. Apparatus for determining the physical configuration of a body mounted for rotating motion on a spindle, comprising
light beam projection means for projecting a light beam along a path directed toward the body on the spindle,
optical means for converting said light beam into a beam contained substantially in a single plane and therefore called a planar light beam,
light sensing means exposed to light reflected from the portion of the mounted body impinged by the planar light beam for providing output signals responsive thereto, and
means coupled to said light sensing means for processing said signals to provide data related to the body configuration.

27. Apparatus as in claim 26 comprising means for calibrating said light sensing means output signals, whereby said data relating to the body configuration is scaled to provide actual distances and locations in the body configuration.

28. Apparatus as in claim 26 wherein said body is a brake member having a friction surface thereon and said spindle is defined by a brake lathe, said light beam projection means comprising means for mounting said light beam projection means to illuminate the friction surface of said brake member with said light beam.

29. Apparatus as in claim 28 wherein said light beam projection means comprises a beam splitter for splitting said light beam, and reflector means, each of said beam splitter and said reflector means functioning to direct a portion of said split light beam towards opposite sides of said brake member friction surfaces.

30. Apparatus as in claim 28 wherein said light beam projection means comprises a laser light source.

31. Apparatus as in claim 28 wherein said light beam projection means comprises a white light source, and wherein said optical means comprises a collimator interposed in the path of said light beam from said white light source, and a cylindrical lens interposed in the path of said light beam from said collimator.

32. Apparatus as in claim 28 wherein said light sensing means comprises a band pass filter receiving the reflected light and passing filtered reflected light, a lens exposed to and operating to focus the filtered reflected light, and a charge coupled device situated to receive the focused filtered reflected light.

33. Apparatus as in claim 26 wherein said body is a vehicle wheel mounted on a vehicle wheel spindle situated to be accessed by a wheel alignment system, said light beam projection means comprising means for mounting said light beam projection means to illuminate the periphery of the vehicle wheel with said light beam.

34. Apparatus as in claim 33 wherein said light beam projection means comprises a laser light source.

35. Apparatus as in claim 33 wherein said light beam projection means comprises a white light source, and wherein said optical means comprises a collimator interposed in the path of said light beam from said white light source, and a cylindrical lens interposed in the path of said light beam from said collimator.

36. Apparatus as in claim 33 wherein said light sensing means comprises a band pass filter receiving the reflected light and passing filtered reflected light, a lens exposed to and operating to focus the filtered reflected light, and a charge coupled device situated to receive the focused filtered reflected light.

37. Apparatus as in claim 26 wherein said body is a wheel rim and wherein said spindle extends from a wheel balancer, said light beam projection means comprising means for mounting said light beam projection means to illuminate the periphery of the wheel rim with said light beam.

38. Apparatus as in claim 37 wherein the wheel rim has an inner rim and an outer rim and wherein said light beam projection means comprises means for mounting said light beam projection means to illuminate said inner and outer rims with said light beam.

39. Apparatus as in claim 37 wherein said light beam projection means comprises a beam splitter for splitting said light beam, and reflector means, each of said beam splitter and said reflector means functioning to direct a portion of said split light beam toward one of the inner and outer rims respectively.

40. Apparatus as in claim 37 wherein said light beam projection means comprises a laser light source.

41. Apparatus as in claim 37 wherein said light beam projection means comprises a white light source, and wherein said optical means comprises a collimator interposed in the path of said light beam from said white light source, and a cylindrical lens interposed in the path of said light beam from said collimator.

42. Apparatus as in claim 37 wherein said light sensing means comprises a band pass filter receiving the reflected light and passing filtered reflected light, a lens exposed to and operating to focus the filtered reflected light, and a charge coupled device situated to receive the focused filtered reflected light.

43. A method of determining specific physical characteristics and features of a body which has some known general body characteristics and features, the body being mounted for rotational motion on a spindle having a known body coordinate system, comprising the steps of directing a planar light array toward the body from a known direction relative to the body coordinate system, detecting the impingement of said light array on the body from a known direction relative to said planar light array known direction, calibrating the detecting impingement of said light array for distances and locations in the known body coordinate system, and transforming the calibrated detected impingement into discrete distances and positions in the known body coordinate system, wherein the positions of the specific physical characteristics and features of the body are established in the body coordinate system.

44. A method as in claim 43 wherein the step of transforming comprises the steps of calculating the positions of the detected impingement in a coordinate system with known orientation relative to the planar light array, transforming the positions in the planar light array coordinate system into the known body coordinate system, and extracting body feature data for use in determining the body physical characteristics.

45. A method as in claim 43 wherein the step of detecting comprises the steps of sensing the positions of impingement along the intersection of the planar light array and the body in two dimensions, and calculating the positions within a coordinate system having known orientation relative to the planar light array known direction.

* * * * *